United States Patent
Bliss et al.

(10) Patent No.: US 9,031,178 B2
(45) Date of Patent: May 12, 2015

(54) GENERALIZED TRANSMIT PRE-CODING FOR OPTICAL AND BACKPLANE CHANNELS

(71) Applicant: Broadcom Corporation, Irvine, CA (US)

(72) Inventors: William Bliss, Granite Canyon, WY (US); Vasudevan Parthasarathy, Irvine, CA (US)

(73) Assignee: Broadcom, Irvine, CA (US)

( * ) Notice: Subject to any disclaimer, the term of this patent is extended or adjusted under 35 U.S.C. 154(b) by 0 days.

(21) Appl. No.: 14/041,924

(22) Filed: Sep. 30, 2013

(65) Prior Publication Data

US 2015/0063828 A1 Mar. 5, 2015

Related U.S. Application Data

(60) Provisional application No. 61/870,517, filed on Aug. 27, 2013.

(51) Int. Cl.
| | |
|---|---|
| *H03K 7/02* | (2006.01) |
| *H04L 25/03* | (2006.01) |
| *H04L 27/04* | (2006.01) |
| *H04B 10/25* | (2013.01) |

(52) U.S. Cl.
CPC .......... *H04L 25/03898* (2013.01); *H04L 27/04* (2013.01); *H04L 25/03949* (2013.01); *H04B 10/25* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00

See application file for complete search history.

(56) References Cited

U.S. PATENT DOCUMENTS

| | | | | |
|---|---|---|---|---|
| 5,559,835 | A  * | 9/1996 | Betts | 375/265 |
| 6,314,135 | B1 * | 11/2001 | Schneider et al. | 375/232 |
| 6,353,629 | B1 * | 3/2002 | Pal | 375/222 |
| 7,133,425 | B2 * | 11/2006 | McClellan | 370/535 |
| 2004/0174937 | A1 * | 9/2004 | Ungerboeck | 375/261 |
| 2007/0014380 | A1 * | 1/2007 | Gu et al. | 375/296 |
| 2007/0121716 | A1 * | 5/2007 | Nagarajan et al. | 375/229 |
| 2011/0164174 | A1 * | 7/2011 | Limberg | 348/467 |

* cited by examiner

*Primary Examiner* — Adolf Dsouza

(74) *Attorney, Agent, or Firm* — Sterne, Kessler, Goldstein & Fox P.L.L.C.

(57) ABSTRACT

Systems that allow for DFE functionality to be eliminated from the receiver side of a communication system and for a DFE-like functionality to be implemented instead at the transmitter side of the communication system are provided. By removing the DFE functionality from the receiver side, error propagation can be eliminated at the receiver and receiver complexity can be reduced drastically. At the transmitter side, the DFE-like functionality provides the same DFE benefits, and with the transmitter environment being noise-free, no errors can occur due noise boosting, for example. The DFE-like functionality at the transmitter side can be implemented using non-linear (recursive or feed-forward) pre-coders or a combination of non-linear pre-coders and linear filters, which can be configured to invert a net communication channel between the transmitter and the receiver. Embodiments particularly suitable for fiber optic channels and server backplane channels are also provided.

18 Claims, 6 Drawing Sheets

GENERALIZED TRANSMIT PRE-CODING FOR OPTICAL AND BACKPLANE CHANNELS

CROSS-REFERENCE TO RELATED APPLICATIONS

The present application claims the benefit of U.S. Provisional Application No. 61/870,517, filed Aug. 27, 2013, which is incorporated herein by reference in its entirety.

BACKGROUND

1. Technical Field

The present disclosure relates generally to transmit pre-coding.

2. Background Art

Decision Feedback Equalizer (DFE)-based data detectors suffer from error propagation, which can be caused by the feedback of a single wrong slicer decision. An error propagation condition can last a considerable amount of time until the DFE-based data detector can recover from it. And, in certain conditions, such as in the case of Pulse Amplitude Modulation (PAM)-M systems with higher 'M' (which use more levels per Baud) and/or wideband Electromagnetic Interference (EMI) events, successive wrong slicer decisions can ultimately cause the data detector to enter into a very long or even an infinite error propagation condition. To resolve such a condition, either erroneous data must be tolerated for a long time or the DFE-based data detector must be returned to a normal operating condition, which is typically done by resetting the detector.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

Figure 1:
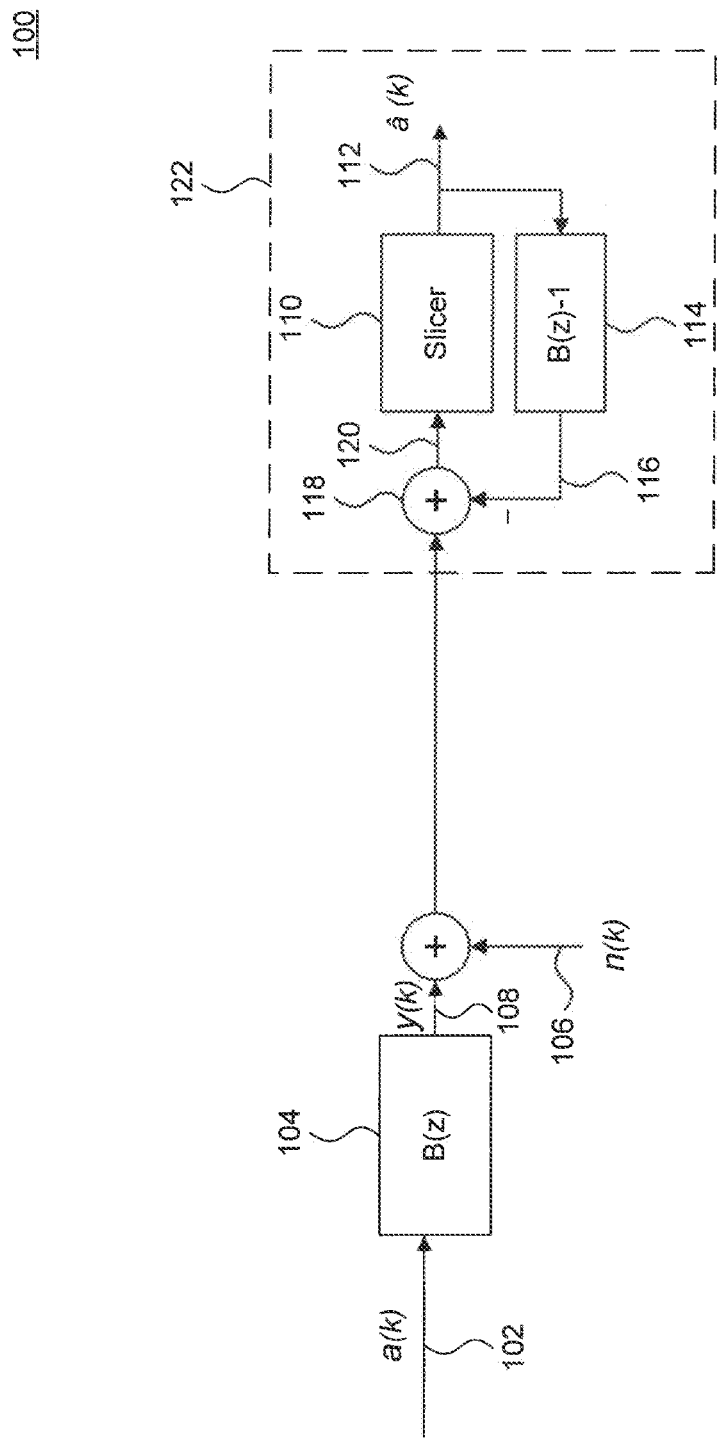
FIG. 1 illustrates an example communication system using a Decision Feedback Equalizer (DFE).

FIG. 1 illustrates an example communication system 100 using a Decision Feedback Equalizer (DFE)-based data detector. Example communication system 100 is provided for the purpose of illustration only and is not limiting of embodiments. Example communication system 100 includes a net communication channel 104, having a Z-transform equal to a polynomial function B(z) (i.e., the transfer function of net communication channel 104 has zeros but no poles), and a DFE-based data detector 122. For the purpose of simplification of presentation, certain components that would be found in systems similar to example communication system 100 are omitted herein as would be apparent to a person of skill in the art.

A sequence of data symbols 102 are transmitted over net communication channel 104 by a transmitter (not shown in FIG. 1). In an embodiment, net communication channel 104 includes analog transmit circuitry of the transmitter, an actual communication channel (e.g., fiber optic channel, copper wire channel, etc.), and analog receive circuitry of a receiver where DFE-based data detector 122 is located.

In an embodiment, data symbols 102 are Pulse Amplitude Modulation (PAM)-M (PAM-M) modulated, such that each symbol of the sequence is encoded using an amplitude taken from M possible levels (e.g., 0, 1, ..., M−1). To transmit the i-th symbol, a pulse with an amplitude a(i) is transmitted, resulting in a transmitted pulse amplitude sequence a(k) (k=0, 1, ...) for transmitted data symbols 102. When M=2, data symbols 102 use a Non-Return to Zero (NRZ), a Return to Zero (RZ), or an On-Off Keying (OOK) modulation scheme. In another embodiment, data symbols 102 are Double Square (DSQ) modulated (e.g., DSQ-32, DSQ-128, etc.).

Data symbols 102 are shaped by net communication channel 104 to produce a sequence of data symbols 108 represented by a pulse amplitude sequence y(k). Data symbols 108 may combine with noise 106, modeled as a sequence n(k), at the input of DFE-based data detector 122. In an embodiment, DFE-based data detector 122 includes, among other components, a slicer 110, a feedback filter 114, and a subtractor module 118. At subtractor module 118, a feedback signal 116, generated by feedback filter 114, is subtracted from pulse amplitude sequence y(k) of data symbols 108 to generate a slicer input signal 120. Slicer 110 acts on slicer input signal 120 to generate a pulse amplitude estimate sequence â(k) 112, which corresponds to the transmitted pulse amplitude sequence a(k). In an embodiment, slicer 110 is configured to slice each symbol contained in signal 120 to a respective slicer level from M possible amplitude levels.

Slicer output signal 112 is fed back to feedback filter 114 to generate feedback signal 116. In an embodiment, feedback filter 114 is configured to have a Z-transform function equal or substantially equal to B(z)−1, where B(z) is the Z-transform function of net communication channel 104. In an embodiment, B(z) is a monic polynomial $b_k z^{-k} + b_{k-1} z^{-(k-1)} + \ldots + b_1 z^{-1} + b_0 z^0$ having a leading coefficient $b_0 = 1$. This ensures that equalization filtering by the DFE is matched to the signal portion and avoids enhancing the noise portion of data symbols 108.

However, because decisions by slicer 110 are fed back as described above, a wrong decision by slicer 110 can cause slicer 110 to make further decision errors, leading to an error propagation condition. An error propagation condition can last a considerable amount of time until the DFE-based data detector can recover from it. And, in certain conditions, such as in the case of higher 'M' PAM-M (which use more levels per Baud) and/or wideband Electromagnetic Interference (EMI) events, slicer 110 can make a large number of successive wrong decisions that can ultimately cause the DFE-based data detector to enter into an infinite error propagation condition. To resolve such a condition, the DFE-based data detector must be returned to a normal operating condition, which is typically done by resetting the detector (which requires physical layer (PHY) re-training).

Embodiments, as further described below, provide systems that allow for DFE functionality to be eliminated from the receiver side of a communication system and for a DFE-like functionality to be implemented instead at the transmitter side of the communication system. By removing the DFE functionality from the receiver side, error propagation can be eliminated at the receiver and receiver complexity can be reduced drastically. At the transmitter side, the DFE-like functionality provides the same DFE benefits, and with the transmitter environment being noise-free, no errors can occur due noise boosting, for example. In an embodiment, the DFE-like functionality at the transmitter side can be implemented using non-linear (recursive or feed-forward) pre-coders or a combination of non-linear pre-coders and linear filters (sometimes referred to as pre-coders in the literature), which can be configured to invert a net communication channel between the transmitter and the receiver. Embodiments particularly suitable for fiber optic channels and server backplane channels are also provided.

Figure 2:
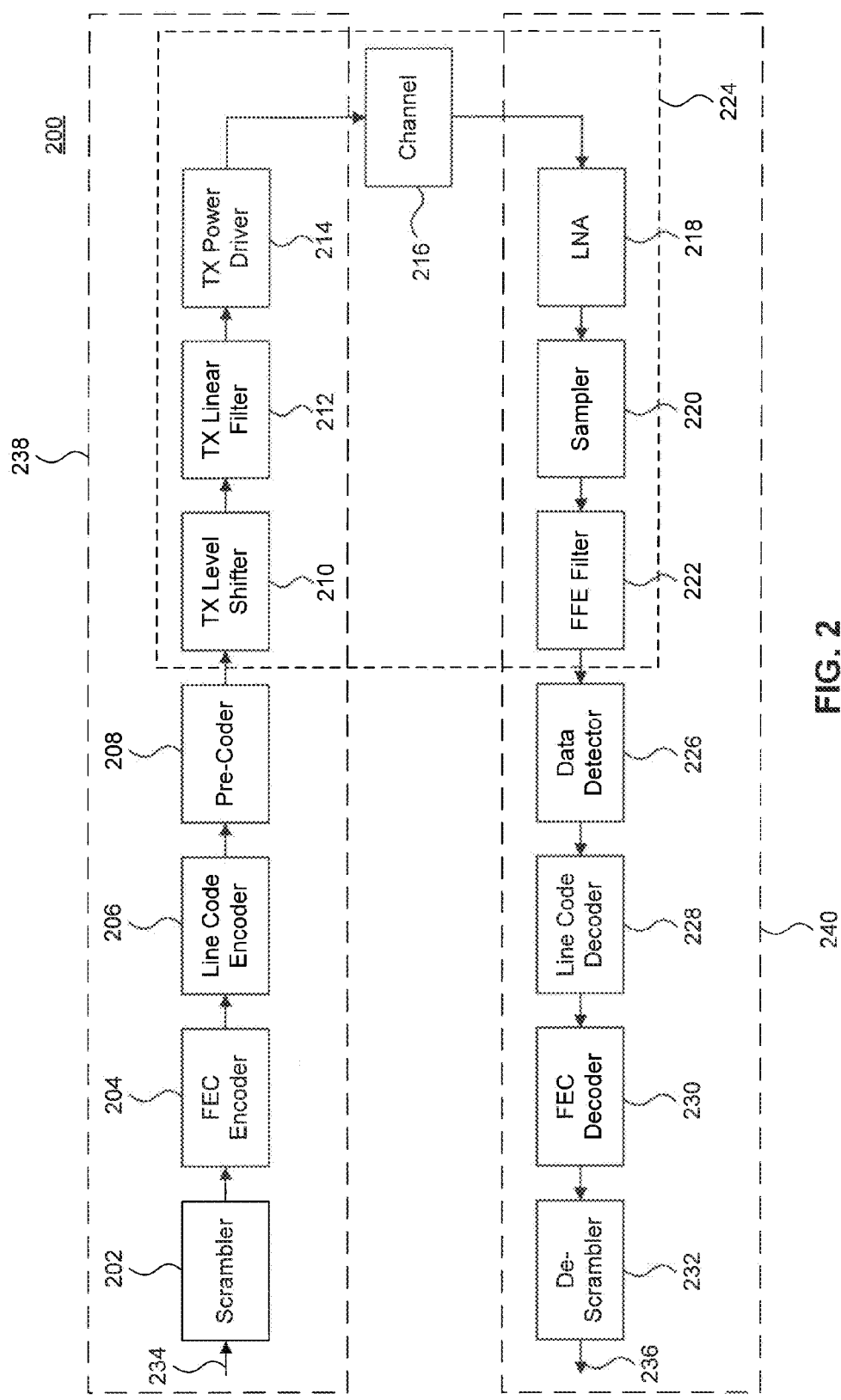
FIG. 2 illustrates an example communication system using a non-linear pre-coder according to an embodiment.

FIG. 2 illustrates an example communication system 200 using a non-linear pre-coder according to an embodiment. Example communication system 200 is provided for the purpose of illustration and is not limiting of embodiments. Example communication system 200 includes a transmitter 238 and a receiver 240, coupled through a communication channel 216. Communication channel 216 can be a fiber optic channel or a copper wire channel (e.g., a server backplane channel), to name a few examples. For the purpose of simplification of presentation, certain components that would be found in systems similar to example communication system 200 are omitted herein as would be apparent to a person of skill in the art.

At transmitter 238, an input signal 234, including a sequence of data symbols, is scrambled by a scrambler 202, Forward Error Correction (FEC) encoded by an FEC encoder 204, and line encoded by a line code encoder 206. Then, the signal is non-linearly pre-coded using a pre-coder 208 (e.g., a linear change in the signal does not result in a linear change in the output of pre-coder 208). In an embodiment, pre-coder 208 can be a recursive non-linear pre-coder. In another embodiment, pre-coder 208 can be a combination of a non-linear pre-coder and a linear filter (sometimes called pre-coder in the literature).

Depending on the modulation scheme used, the output signal of pre-coder 208 may be constellation mapped before being forwarded to transmit (TX) level shifter 210. In an embodiment, TX level shifter 210, TX linear filter 212, and TX power driver 214 are part of analog transmit circuitry of transmitter 238. The analog transmit circuitry can include additional components not shown in FIG. 2. TX level shifter 210 adjusts an amplitude level of the signal depending on the pre-coded data symbols contained therein. For example, in a PAM-M system, TX level shifter 210 can choose from M different amplitude levels. TX linear filter 212 performs linear filtering on the signal. TX power driver 214 can perform additional amplification on the signal before forwarding to a power amplifier (PA) (now shown in FIG. 2).

At receiver 240, the signal is received by analog receive circuitry, which includes, without limitation, a Low Noise Amplifier (LNA) 218, a sampler 220, and feed-forward equalizer (FFE) filter 222, for example. The signal is then acted upon by a data detector 226. In an embodiment, data detector 226 is configured to map each of the pre-coded data symbols contained in the signal to a respective amplitude level from a set of M amplitude levels. The output of data detector 226 is then acted upon by a line code decoder 228, a FEC decoder 230, and a de-scrambler 232, to undo the transmit line encoding, FEC encoding, and scrambling and retrieve the transmitted sequence of data symbols in an output signal 236.

In an embodiment, pre-coder 208 of transmitter 238 is configured to match substantially an inverse transfer function of a net communication channel 224, formed by the analog circuitry of transmitter 238 (including, without limitation, TX level shifter 210, TX linear filter 212, and TX Power Driver 214), communication channel 216, and the receiver analog circuitry of receiver 240 (including, without limitation, LNA 218, sampler 220, and FFE filter 222). As a result, decision feedback equalization at receiver 240 can be reduced or eliminated entirely, resulting in a low complexity data detector 226. For example, in an embodiment, data detector 226 can be a low complexity analog slicer.

Figure 3:
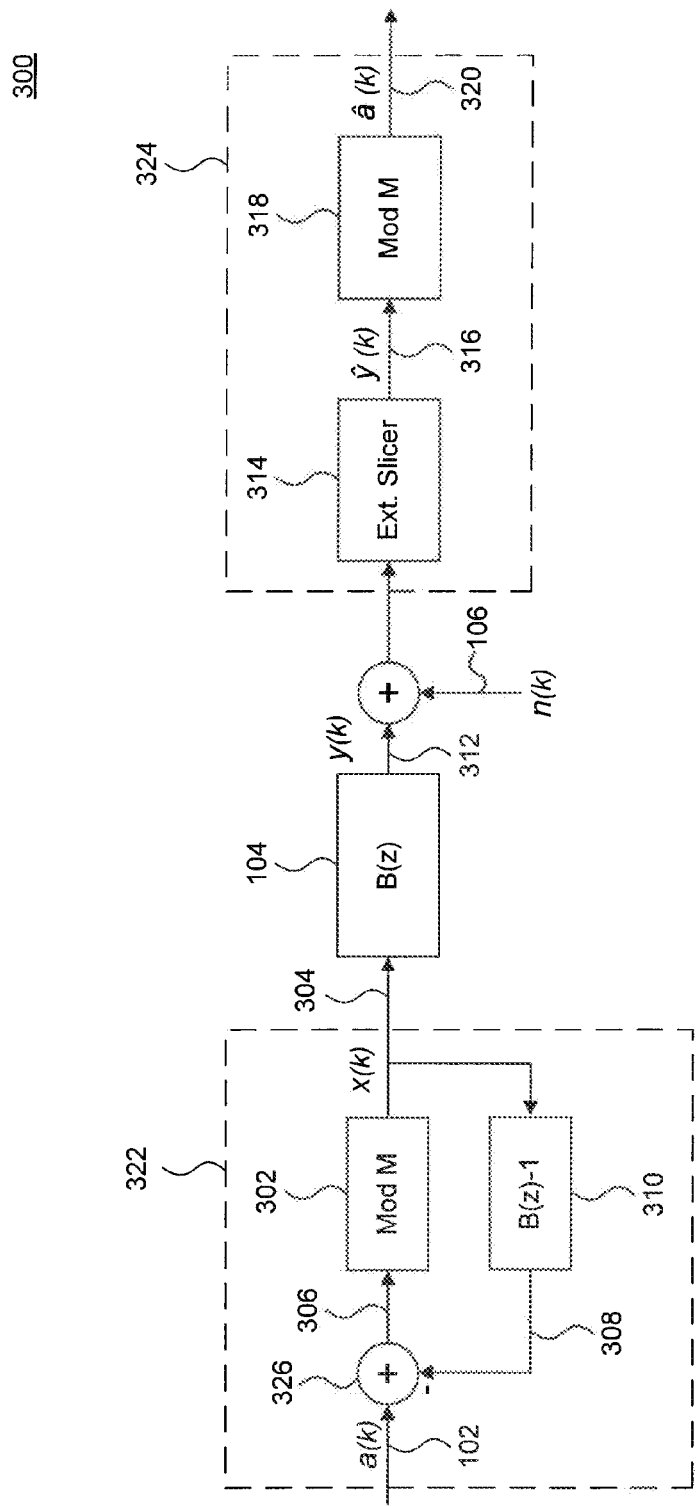
FIG. 3 illustrates an example communication system using a non-linear Infinite Impulse Response (IIR) pre-coder according to an embodiment.

FIG. 3 illustrates an example communication system 300 using a non-linear infinite impulse response (IIR) pre-coder according to an embodiment. Example communication system 300 is provided for the purpose of illustration and is not limiting of embodiments. For the purpose of simplification of presentation, certain components that would be found in systems similar to example communication system 300 are omitted herein as would be apparent to a person of skill in the art.

Example communication system 300 includes a non-linear pre-coder 322, a net communication channel 104, and a data detector 324. As would be understood by a person of skill in the art, pre-coder 322 can be located in a transmitter, such as transmitter 238, and data detector 324 can be located in a receiver, such as receiver 240. As described above with reference to FIG. 1, net communication channel 104 includes analog transmit circuitry of the transmitter where pre-coder 322 is located, an actual communication channel (e.g., fiber optic channel, copper wire channel, etc.) between the transmitter and the receiver, and analog receive circuitry of the receiver where data detector 324 is located. The communication channel can be a fiber optic channel or a copper wire channel (e.g., a server backplane channel), to name a few examples.

Pre-coder 322 is configured to receive a sequence of data symbols 102 and to generate a sequence of pre-coded data symbols 304. Pre-coded data symbols 304 are shaped by net communication channel 104 to produce a sequence of pre-coded data symbols 312 represented by a pulse amplitude sequence y(k). Pre-coded data symbols 312 are filtered by channel 104. Pre-coded data symbols 312 may combine with noise 106, modeled as a sequence n(k), at the input of data detector 324. Data detector 324 is configured to map each of pre-coded data symbols 312 to a respective amplitude level from a set of M amplitude levels, to generate a pulse amplitude estimate sequence â(k) 320.

As shown in FIG. 3, net communication channel 104 has a Z-transform equal to a polynomial B(z). This means that net communication channel 104 is a Finite Impulse Response (FIR) channel, i.e., a channel whose transfer function can include zeros but no poles. Accordingly, in an embodiment, pre-coder 322 is configured as a non-linear IIR pre-coder that matches substantially an inverse transfer function of net communication channel 104.

In an embodiment, pre-coder 322 includes a modulo-M circuit 302, a feedback filter 310, and a subtractor module 326. Modulo-M circuit 302 is configured to receive a difference signal 306 between the sequence of data symbols 102 and a feedback signal 308 and to generate the sequence of pre-coded data symbols 304. Modulo-M circuit 302 performs a modulo-M operation on difference signal 306 (in an embodiment, the modulo-M operation adds a multiple of M to difference signal 306), rendering pre-coder 322 non-linear. Feedback filter 310 is coupled to an output of modulo-M circuit 302 and is configured to receive the sequence of pre-coded data symbols 304 and to generate feedback signal 308. Subtractor module 326 is coupled between feedback filter 310 and modulo-M circuit 302 and is configured to subtract feedback signal 308 from the sequence of data symbols 102 to generate difference signal 306.

In an embodiment, feedback filter 310 is an FIR filter. In order for pre-coder 322 to match substantially the inverse transfer function of net communication channel 104, in an embodiment, feedback filter 310 is configured to have a Z-transform equal or substantially equal to the polynomial B(z)−1, where B(z) is the Z-transform of net communication channel 104. In an embodiment, the coefficients of the polynomial B(z) are all integers, resulting in pre-coder 322 being a Partial Response (PR) pre-coder. A PR pre-coder is well suited for 100 GBASE-KP4 type communication systems, such as server backplane communication systems. In another embodiment, the polynomial B(z) can be forced to have all-integer coefficients using a feed-forward equalizer, placed at the transmitter and/or receiver side, within net communication channel 104. In another embodiment, pre-coder 322 can be a Tomlinson-Harashima Precoder (THP) with configurable coefficients. The coefficients of pre-coder 322 can be determined and/or adapted based on receiver feedback sent by the receiver to the transmitter via a back-channel.

With non-linear pre-coding performed at the transmitter side, data detector 324 can be DFE-less (not DFE-based). This eliminates error propagation that can be caused by a DFE and reduces receiver complexity. In an embodiment, detector 324 includes a slicer 314 and a modulo-M circuit 318. Because of the non-linear pre-coding, in an embodiment, slicer 314 has an extended dynamic range. In an embodiment, slicer 314 is configured to slice each of pre-coded data symbols 312 to a respective slicer level from a multiple of M (e.g., 2M) amplitude levels to generate a slicer output signal 316. In another embodiment, the extended dynamic range of slicer 314 includes only one level above and one level below beyond a typical PAM-M slicer range. Modulo-M circuit 318 is configured to perform a modulo-M operation on slicer output signal 316 to generate an amplitude level estimate sequence â(k) 320 for pre-coded data symbols 312.

Figure 4:
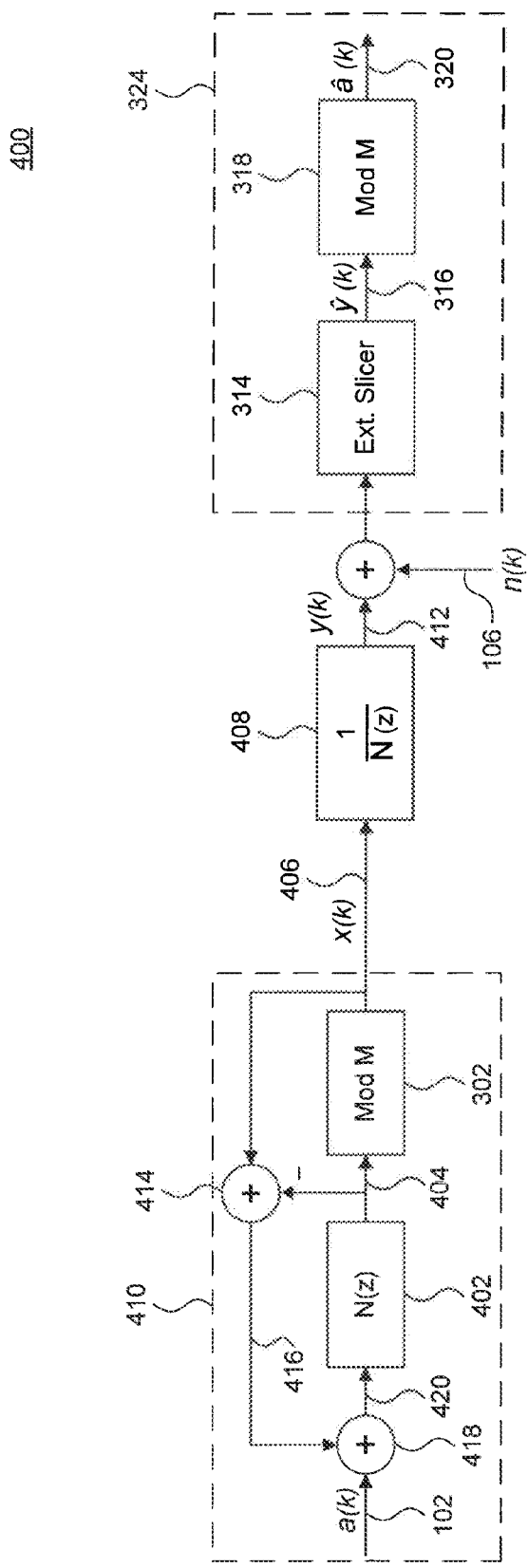
FIG. 4 illustrates an example communication system using a non-linear Finite Impulse Response (FIR) pre-coder according to an embodiment.

FIG. 4 illustrates an example communication system 400 using a non-linear Finite Impulse Response (FIR) pre-coder according to an embodiment. Example communication system 400 is provided for the purpose of illustration and is not limiting of embodiments. For the purpose of simplification of presentation, certain components that would be found in systems similar to example communication system 400 are omitted herein as would be apparent to a person of skill in the art.

Example communication system 400 includes a non-linear pre-coder 410, a net communication channel 408, and a data detector 324. As would be understood by a person of skill in the art, pre-coder 410 can be located in a transmitter, such as transmitter 238, and data detector 324 can be located in a receiver, such as receiver 240. Net communication channel 408 includes analog transmit circuitry of the transmitter where pre-coder 410 is located, an actual communication channel (e.g., fiber optic channel, copper wire channel, etc.) between the transmitter and the receiver, and analog receive circuitry of the receiver where data detector 324 is located. The communication channel can be a fiber optic channel or a copper wire channel (e.g., a server backplane channel), to name a few examples.

Pre-coder 410 is configured to receive a sequence of data symbols 102 and to generate a sequence of pre-coded data symbols 406. Pre-coded data symbols 406 are shaped by net communication channel 408 to produce a sequence of pre-coded data symbols 412 represented by a pulse amplitude sequence y(k). Pre-coded data symbols 412 may combine with noise 106, modeled as a sequence n(k), at the input of data detector 324. Data detector 324 is configured to map each of pre-coded data symbols 412 to a respective amplitude level from a set of M amplitude levels, to generate a pulse amplitude estimate sequence â(k) 320.

As shown in FIG. 4, net communication channel 408 has a Z-transform equal to 1/N(z), where N(z) is a polynomial. This means that net communication channel 408 is an Infinite Impulse Response (IIR) channel, i.e., a channel whose transfer function can include poles but no zeros. In practice, the poles are inside the unit circle so the channel is stable. Accordingly, in an embodiment, pre-coder 322 is configured as a non-linear FIR pre-coder that matches substantially an inverse transfer function of net communication channel 408. This embodiment is well suited for optical fiber channels, for example, which typically can be modeled as IIR channels with one or two or a small number of poles. Also, this embodiment can be suited for channels that have a response that is dominated by analog circuitry (e.g., the analog circuitry in the net communication channel (e.g., electro-optics) provide one or more real poles in the channel transfer function and are the main bandwidth bottleneck).

In an embodiment, pre-coder 410 includes a feed-forward FIR filter 402, a modulo-M circuit 302, an adder module 418, and a subtractor module 414. Adder module 418 is configured to sum the sequence of data symbols 102 and a feedback signal 416 to generate a filter input signal 420. FIR filter 402 is configured to receive filter input signal 420 and to generate a sequence of filtered data symbols 404. Modulo-M circuit 302 is configured to perform a modulo-M operation on the sequence of filtered data symbols 404 to generate the sequence of pre-coded data symbols 406. Feedback signal 416 is generated by subtractor module 414 subtracting filtered data symbols 404 from pre-coded data symbols 406. In an embodiment, the addition of feedback signal 416 to the sequence of data symbols 102 is equivalent to adding a quantity equal to M·v(k) to data symbols 102, where M corresponds to the number of levels of the PAM-M modulation and v(k) is an integer such that x(k) falls in the range [0,M) (i.e., 0≤x(k)<M). In an embodiment, the modulo-M operation adds a multiple of M to each of filtered data symbols 404, rendering pre-coder 410 non-linear.

In an embodiment, in order for pre-coder 410 to match substantially the inverse transfer function of net communication channel 408, feed-forward filter 402 is configured to have a Z-transform equal or substantially equal to the polynomial N(z), where 1/N(z) is the Z-transform of net communication channel 408. In an embodiment, the polynomial N(z) of feed-forward filter 402 is such that the coefficients $(n_k, n_{k-1}, \ldots, n_1, n_0)$ of the polynomial are all from the set {integer/q}, where q can be equal to 2, 3, 4, and 5, for example.

With non-linear pre-coding performed at the transmitter side, data detector 324 can be DFE-less (not DFE-based) as described above with respect to example communication system 300. This eliminates error propagation that can be caused by a DFE and reduces receiver complexity. In an embodiment, detector 324 can be configured to have a transfer function equation as N(D)=modulo-M (1−0.5D). This matches a fiber optic channel with approximately 9.5 dB rolloff at the Nyquist frequency, which is a typical fiber optic channel with bandwidth limitations due to electro-optics. In this embodiment, with q=2, note that the output 406 of the pre-coder 410 is also limited to the half integers, which reduces the number of 'levels' which are transmitted and limits the dynamic range of the TX output in example communication system 400. For example, with q=2, the PAM-M input alphabet {0, 1, ..., M−1} is translated to a finite pre-coder output alphabet {0, 0.5, 1, 1.5 ..., (M−0.5)}.

Figure 5:
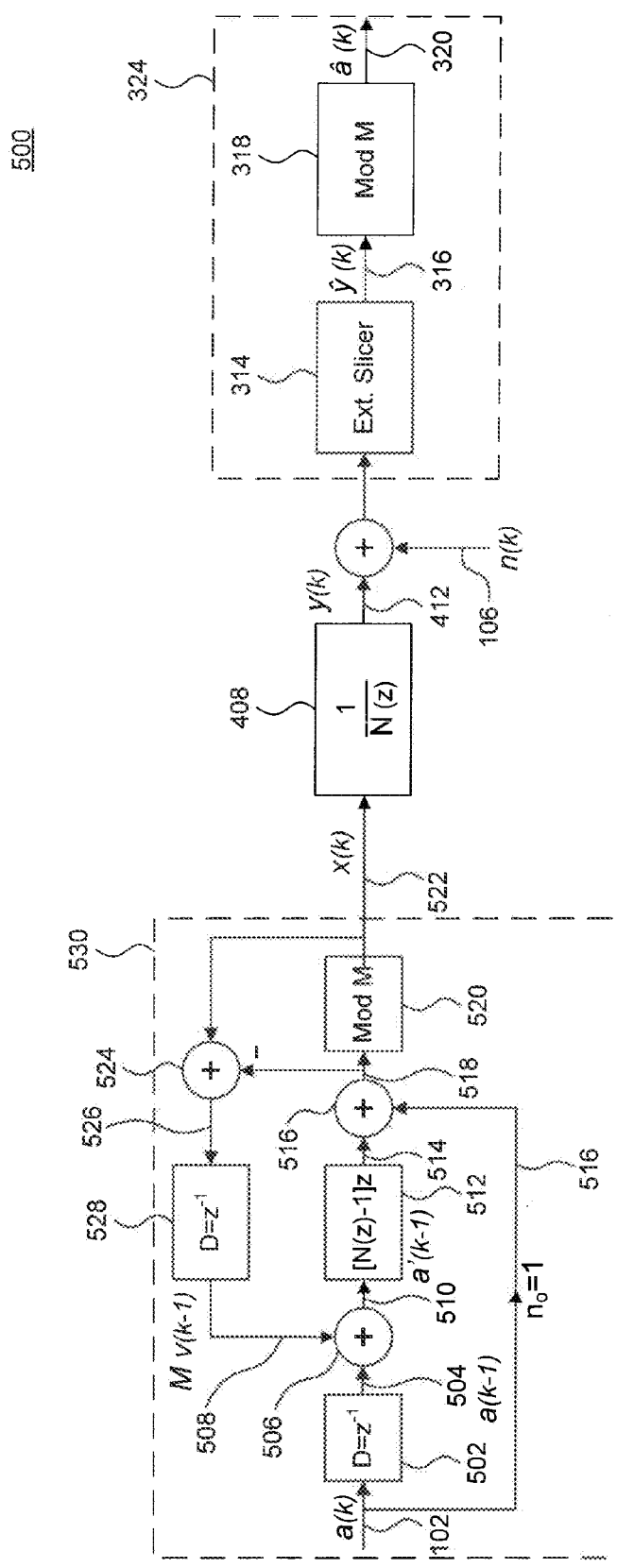
FIG. 5 illustrates the FIR pre-coder according to another embodiment that shows all calculations can be implemented with unit delay.

FIG. 5 illustrates an example communication system 500 using a non-linear Finite Impulse Response (FIR) pre-coder according to an embodiment. Example communication system 500 is provided for the purpose of illustration and is not limiting of embodiments. For the purpose of simplification of presentation, certain components that would be found in systems similar to example communication system 500 are omitted herein as would be apparent to a person of skill in the art.

Example communication system 500 includes a non-linear pre-coder 530, a net communication channel 408, and a data detector 324. As would be understood by a person of skill in the art, pre-coder 530 can be located in a transmitter, such as transmitter 238, and data detector 324 can be located in a receiver, such as receiver 240. Net communication channel 408 includes analog transmit circuitry of the transmitter where pre-coder 530 is located, an actual communication channel (e.g., fiber optic channel, copper wire channel, etc.) between the transmitter and the receiver, and analog receive circuitry of the receiver where data detector 324 is located. The communication channel can be a fiber optic channel or a copper wire channel (e.g., a server backplane channel), to name a few examples.

Pre-coder 530 is configured to receive a sequence of data symbols 102 and to generate a sequence of pre-coded data symbols 522. Pre-coded data symbols 522 are shaped by net communication channel 408 to produce a sequence of pre-coded data symbols 412 represented by a pulse amplitude sequence y(k). Pre-coded data symbols 412 may combine with noise 106, modeled as a sequence n(k), at the input of data detector 324. Data detector 324 is configured to map each of pre-coded data symbols 412 to a respective amplitude level from a set of M amplitude levels, to generate a pulse amplitude estimate sequence â(k) 320.

As shown in FIG. 5, net communication channel 408 has a Z-transform equal to $1/N(z)$, where $N(z)$ is a polynomial. This means that net communication channel 408 is an Infinite Impulse Response (IIR) channel, i.e., a channel whose transfer function can include poles but no zeros. In practice, the poles are inside the unit circle so the channel is stable. Accordingly, in an embodiment, pre-coder 530 is configured as a non-linear FIR pre-coder that matches substantially an inverse transfer function of net communication channel 408. This embodiment is well suited for optical fiber channels, for example, which typically can be modeled as IIR channels with one or two or a small number of poles. Also, this embodiment can be suited for channels that have a response that is dominated by analog circuitry (e.g., the analog circuitry in the net communication channel (e.g., electro-optics) provide one or more real poles in the channel transfer function and are the main bandwidth bottleneck).

In an embodiment, pre-coder 520 includes a delay element 502, an adder module 506, a feed-forward filter 512, an adder module 516, a modulo-M circuit 520, a subtractor module 524, and a delay element 528. Delay element 502 is configured to receive the sequence of data symbols 102 and to generate a delayed sequence of data symbols 504, represented by the sequence a(k−1). Data symbols 504 are summed with a feedback signal 508 by adder module 506 to generate a sequence of data symbols 510, represented by the sequence a'(k−1). Data symbols 510 are then acted upon by feed-forward filter 512 to generate filtered data symbols 514. Data symbols 514 are summed with data symbols 102 in adder module 516 to generate a sequence of data symbols 518. Data symbols 518 are acted upon by modulo-M circuit 520 to generate pre-coded data symbols 522. Subtractor module 524 subtracts data symbols 518 from pre-coded data symbols 522 to generate a feedback signal 526. Feedback signal 526 is delayed by delay element 528 to generate feedback signal 508.

It is noted that the implementation of pre-coder 530 accommodates any delay that can be present in the feedback loop from the output of modulo-M circuit 520. For this purpose, the feed-forward filter (e.g., feed-forward filter 402 described above in FIG. 4), which can be assumed to have a monic polynomial $N(z)$ ($N(z)=n_k z^{-k}+n_{k-1}z^{-k+1}+\ldots+n_1 z^1+n_0 z^0$), is implemented as two paths being added together by adder module 516. The first path is provided by a path 516 having a transfer function equal to 1, which accounts for the first coefficient ($n_0=1$). The second path is provided by delay element 502 and feed-forward filter 512, which together have a transfer function equal to $N(z)-1$.

In an embodiment, in order for pre-coder 410 to match substantially the inverse transfer function of net communication channel 408, feed-forward filter 402 is configured to have a Z-transform equal or substantially equal to the polynomial $N(z)$, where $1/N(z)$ is the Z-transform of net communication channel 408.

With non-linear pre-coding performed at the transmitter side, data detector 324 can be DFE-less (not DFE-based) as described above with respect to example communication system 300. This eliminates error propagation that can be caused by a DFE and reduces receiver complexity. In an embodiment, detector 324 can be configured to have a transfer function equation as $N(D)=\text{modulo-M}(1-0.5D)$. This matches a fiber optic channel with approximately 9.5 dB rolloff at the Nyquist frequency, which is a typical fiber optic channel with bandwidth limitations due to electro-optics.

Figure 6:
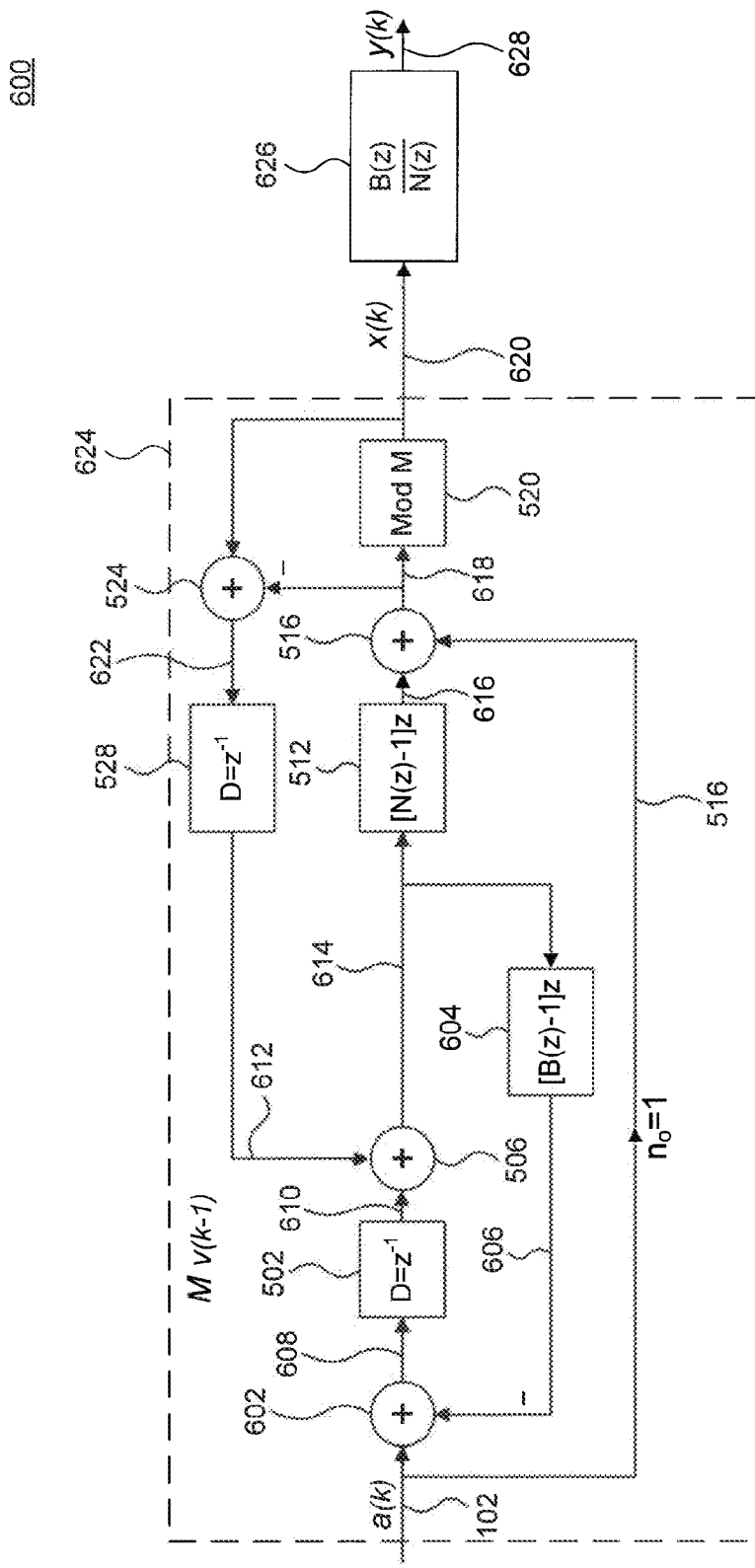
FIG. 6 illustrates an example communication system using a hybrid IIR/FIR pre-coder according to an embodiment.

FIG. 6 illustrates an example communication system 600 using a hybrid IIR/FIR pre-coder according to an embodiment. Example communication system 600 is provided for the purpose of illustration and is not limiting of embodiments. For the purpose of simplification of presentation, certain components that would be found in systems similar to example communication system 600 are omitted herein as would be apparent to a person of skill in the art.

Example communication system 600 includes a non-linear hybrid IIR/FIR pre-coder 624 and a net communication channel 626, and a data detector (not shown in FIG. 4), which may be similar to data detector 324 described above. As would be understood by a person of skill in the art, pre-coder 624 can be located in a transmitter, such as transmitter 238, and the data detector can be located in a receiver, such as receiver 240. Net communication channel 626 includes analog transmit circuitry of the transmitter where pre-coder 624 is located, an actual communication channel (e.g., fiber optic channel, copper wire channel, etc.) between the transmitter and the receiver, and analog receive circuitry of the receiver where the data detector is located. The communication channel can be a fiber optic channel, a copper wire channel (e.g., a server backplane channel), or a hybrid fiber optic/copper wire channel, to name a few examples.

Pre-coder 624 is configured to receive a sequence of data symbols 102 and to generate a sequence of pre-coded data symbols 620. Pre-coded data symbols 620 are shaped by net communication channel 626 to produce a sequence of pre-coded data symbols 628 represented by a pulse amplitude sequence y(k). Pre-coded data symbols 628 may combine with noise at the input of the data detector. The data detector is configured to map each of pre-coded data symbols 628 to a respective amplitude level from a set of M amplitude levels, to generate a pulse amplitude estimate sequence f(k).

As shown in FIG. 6, net communication channel 626 has a Z-transform equal to B(z)/N(z), where B(z) and N(z) are polynomials. This means that net communication channel 626 is a hybrid Finite Impulse Response (FIR)/Infinite Impulse Response (IIR) channel, i.e., a channel whose transfer function can include both zeros and poles. Accordingly, in an embodiment, pre-coder 624 is configured as a non-linear hybrid IIR/FIR pre-coder that matches substantially an inverse transfer function of net communication channel 626. This embodiment is well suited for hybrid optical fiber-copper wire channels, such as Ethernet Passive Optical Network over Coax (EPOC) channels, for example.

In an embodiment, pre-coder 624 includes a subtractor module 602, a feedback filter 604, a delay element 502, an adder module 506, a feed-forward FIR filter 512, an adder module 516, a modulo-M circuit 520, a subtractor module 524, and a delay element 528.

In an embodiment, subtractor module 602 is configured to subtract a feedback signal 606 from the sequence of data symbols 102 to generate data symbols 608. Data symbols 608 are delayed by delay element 502 to generate delayed data symbols 610. Delayed data symbols 610 are summed with a feedback signal 612 to generate data symbols 614. Data symbols 614 are fed back to feedback signal 604 to generate feedback signal 606 and input into feed-forward filter 512 to generate filtered data symbols 616. Filtered data symbols 616 are summed with data symbols 102 in adder module 516 to generate a sequence of data symbols 618. Data symbols 618 are acted upon by modulo-M circuit 520 to generate pre-coded data symbols 620. Data symbols 620 are fed back to subtractor module 524, which subtracts data symbols 618 from data symbols 620 to generate a feedback signal 622. Feedback signal 622 is delayed by delay element 528 to generate feedback signal 612.

In an embodiment, in order for pre-coder 624 to match substantially the inverse transfer function of net communication channel 626, feed-forward filter 512 is configured to have a Z-transform equal or substantially equal to the polynomial [N(z)−1]*z and feedback filter 604 is configured to have a Z-transform equal or substantially equal to the polynomial [B(z)−1]*z, where N(z) is the denominator polynomial and B(z) is the numerator polynomial of the Z-transform of net communication channel 626. In an embodiment, the coefficients of the polynomial B(z) are all integers, resulting in pre-coder 624 being a hybrid Partial Response (PR) pre-coder. In another embodiment, the polynomial N(z) of feed-forward filter 402 is such that the coefficients $(n_k, n_{k-1}, \ldots, n_1, n_0)$ of the polynomial are all from the set {integer/q}, where q can be equal to 2, 3, 4, and 5, for example.

In an embodiment, hybrid FIR/IIR pre-coder 624 can substantially match net communication channel 626 with transform B(D)/N(D)=(1−0.5D)/(1+D), where the PAM-M input alphabet {0, 1, . . . , M−1} is mapped to a finite pre-coded output alphabet {0, 0.5, 1, 1.5, . . . (M−0.5)}.

With non-linear pre-coding performed at the transmitter side, the data detector can be DFE-less (not DFE-based) as described above with respect to example communication system 300. This eliminates error propagation that can be caused by a DFE and reduces receiver complexity.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments, but should be defined only in accordance with the following claims and their equivalents.

What is claimed is:

1. A transmitter, comprising:
   a non-linear pre-coder comprising a non-linear Finite Impulse Response (FIR) pre-coder configured to receive a sequence of data symbols and to generate a sequence of pre-coded data symbols, wherein the non-linear FIR pre-coder comprises:
      an adder configured to sum the sequence of data symbols with a feedback signal based on an output of a modulo-M circuit to generate an input signal;
      a FIR filter configured to filter the input signal to generate a sequence of filtered data symbols; and
      the modulo-M circuit, coupled to the FIR filter, configured to perform a modulo-M operation on the sequence of filtered data symbols to generate the sequence of pre-coded data symbols; and
   analog transmit circuitry, coupled to the non-linear pre-coder, configured to transmit the sequence of pre-coded data symbols over a communication channel to a receiver,
   wherein the non-linear pre-coder is further configured to match substantially an inverse transfer function of a net communication channel, the net communication channel including the analog transmit circuitry, the communication channel, and an analog receive circuitry of the receiver.

2. The transmitter of claim 1, wherein the sequence of data symbols includes Pulse Amplitude Modulated (PAM)-M modulated symbols.

3. The transmitter of claim 1, wherein the net communication channel is an Infinite Impulse Response (IIR) channel.

4. The transmitter of claim 1, wherein the communication channel is a fiber optic channel.

5. The transmitter of claim 1, wherein the FIR filter of the non-linear FIR pre-coder is represented by a polynomial having coefficients from a number set that can be described mathematically as {integer/q}, where q is an integer greater than 1.

6. The transmitter of claim 1, wherein the communication channel is a server backplane channel.

7. The transmitter of claim 1, wherein the net communication channel is a hybrid FIR/Infinite Impulse Response (IIR) channel.

8. The transmitter of claim 7, wherein the non-linear pre-coder further comprises a non-linear IIR pre-coder, which forms together with the non-linear FIR pre-coder a non-linear hybrid IIR/FIR pre-coder.

9. A communication system, comprising:
  a transmitter, comprising:
    a non-linear pre-coder comprising a non-linear Finite Impulse Response (FIR) pre-coder configured to receive a sequence of Pulse Amplitude Modulation (PAM)-M modulated data symbols and to generate a sequence of pre-coded data symbols, wherein the non-linear FIR pre-coder comprises:
      an adder configured to sum the sequence of PAM-M modulated data symbols with a feedback signal based on an output of a modulo-M circuit to generate an input signal;
      a FIR filter configured to filter the input signal to generate a sequence of filtered data symbols; and
      the modulo-M circuit, coupled to the FIR filter, configured to perform a modulo-M operation on the sequence of filtered data symbols to generate the sequence of pre-coded data symbols; and
    analog transmit circuitry, coupled to the non-linear pre-coder, configured to transmit the sequence of pre-coded data symbols over a communication channel; and
  a receiver, coupled via the communication channel to the transmitter, comprising:
    analog receive circuitry configured to receive the sequence of pre-coded data symbols over the communication channel; and
    a data detector configured to map each of the pre-coded data symbols to a respective amplitude level from a set of M amplitude levels,
  wherein the non-linear pre-coder is further configured to match substantially an inverse transfer function of a net communication channel, the net communication channel including the analog transmit circuitry, the communication channel, and the analog receive circuitry of the receiver.

10. The communication system of claim 9, wherein the data detector comprises:
  a slicer configured to slice each of the pre-coded data symbols to a respective slicer level from a multiple of M amplitude levels; and
  a modulo-M circuit configured to perform a modulo-M operation on the respective slicer level to generate the respective amplitude level for each of the pre-coded data symbols.

11. The communication system of claim 9, wherein the FIR filter of the non-linear FIR pre-coder is represented by a polynomial having coefficients from a number set that can be described mathematically as {integer/q}, where q is an integer greater than 1.

12. The communication system of claim 9, wherein the communication channel is a fiber optic channel.

13. The communication system of claim 9, wherein the net communication channel is a hybrid FIR/Infinite Impulse Response (IIR) channel.

14. The communication system of claim 13, wherein the non-linear pre-coder further comprises a non-linear IIR pre-coder, which forms together with the non-linear FIR pre-coder a non-linear hybrid IIR/FIR pre-coder.

15. The communication system of claim 9, wherein the data detector is Decision Feedback Equalizer (DFE)-less.

16. The communication system of claim 9, wherein the receiver is configured to send receiver feedback via a back-channel to the transmitter, and wherein the transmitter is configured to adapt the non-linear pre-coder responsive to the receiver feedback.

17. A transmitter for Pulse Amplitude Modulation (PAM)-M transmission over a fiber optic channel, comprising:
  an adder configured to sum a sequence of PAM-M modulated data symbols with a feedback signal based on an output of a modulo-M circuit to generate an input signal;
  a Finite Impulse Response (FIR) filter configured to filter the input signal to generate a sequence of filtered data symbols;
  the modulo-M circuit, coupled to the FIR filter, configured to perform a modulo-M operation on the sequence of filtered data symbols to generate a sequence of pre-coded data symbols; and
  analog transmit circuitry configured to transmit the sequence of pre-coded data symbols over the fiber optic channel to a receiver.

18. The transmitter of claim 17, wherein the FIR filter is configured to have a transfer function substantially equal to the inverse of a transfer function of a net communication channel, the net communication channel including the analog transmit circuitry of the transmitter, the fiber optic channel, and analog receive circuitry of the receiver.

\* \* \* \* \*